Patented July 21, 1953

2,646,355

UNITED STATES PATENT OFFICE 2,646,355

PROCESS FOR BRIGHTENING FOODSTUFFS CONTAINING CARBOHYDRATES

Hans-Heini Zweifel and Franz Ackermann, Binningen, Switzerland, assignors to Ciba Limited, Basel, Switzerland, a Swiss firm No Drawing. Application November 28, 1949, Serial No. 129,872. In Switzerland December 1, 1948

22 Claims. (Cl. 99—148)

This invention relates to the enhancement of the white appearance of carbohydrate-containing foodstuffs, such as water soluble saccharides and flours by incorporating in them a quantity which is nontoxic to man of a compound which when dissolved or when applied to a substratum shows a blue to violet fluorescence in ultraviolet light.

If e. g. wheat flour treated in the indicated manner is used to make baker's ware, such as bread, the appearance of the latter is much brighter than that of similar wares made from untreated flour.

Among the carbohydrate-containing foodstuffs whose white appearance is capable of improvement according to the present invention may be mentioned the following:

Water soluble saccharides, e. g. monosaccharides, such as pentoses and hexoses, e. g. 1-arabinose, d-glucose, d-galactose, d-fructose; also sugar-like polysaccharides, such as cane sugar or milk sugar; furthermore cereal flours, e. g. wheat, rye, barley, maize, rice flours, also potato flour and flour from other plant products.

As compounds which when dissolved or when applied to a substratum show a blue to violet fluorescence in ultraviolet light and which when used in small quantity are non-toxic to human beings, there may be mentioned the following by way of example:

(A) Blue to violet fluorescent compounds of the coumarin series, particularly those which carry a 7-positioned hydroxy group or a basic amino group. For the purposes of this invention, basic amino groups are defined as (a) primary amino groups or (b) secondary or tertiary amino groups which are substituted by alkyl or aralkyl groups, the alkyl or aralkyl groups being unsubstituted or carrying, if desired, substituents imparting water-solubility, such as sulfonic acid groups. This class includes, for example, water soluble salts of β-methylumbelliferone, acetic acid, 7-ethylamino-coumarin, 7-diethylamino-coumarin, 7-(benzyl-ethyl)-amino-coumarin, and compounds of the general formula

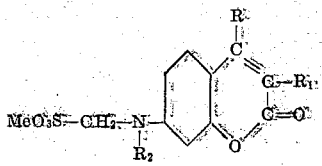

wherein R and R₁ stand for hydrogen or a substituted or unsubstituted alkyl or aralkyl radical, R₂ for hydrogen or an alkyl or aralkyl radical and Me for a cation. Compounds of this general formula are easily obtainable from the corresponding aminocoumarins of the formula

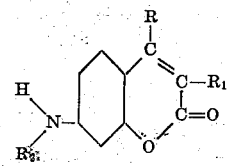

wherein R, R₁ and R₂ have the above indicated significance, by treatment with aldehyde bisulfite compounds, particularly with sodium formaldehyde bisulfite.

(B) Blue to violet fluorescent imidazoles, thiazoles and oxazoles, for example, the compounds of the formulae

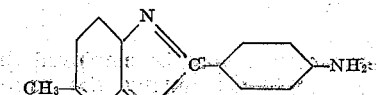

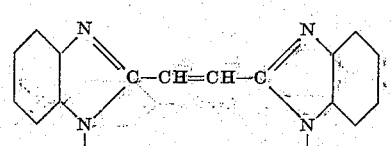

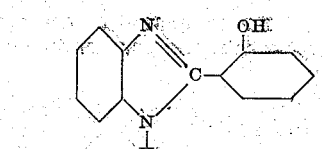

or

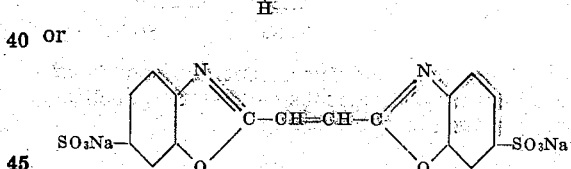

(C) Blue to violet fluorescent salts of hydroxy or amino-naphthalene sulfonic acids, e. g. of 2-amino-naphthalene disulfonic acid-(6,8) or of 2-hydroxy-naphthalene-disulfonic acid-(2,6).

(D) Blue to violet fluorescent aromatic hydroxy carboxylic acids or salts thereof, e. g. salts of salicylic acid or of carboxylic acids of the formula

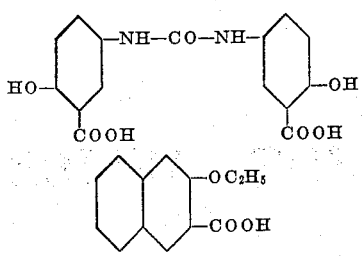

and

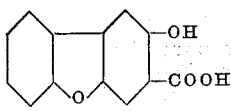

(E) Blue to violet fluorescent compounds of the diphenyl, dibenzyl, or stilbene series, e. g. salts of sulfonic acids with the atom grouping

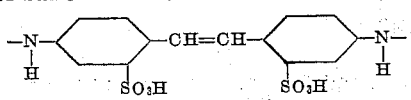

Examples thereof are salts of sulfonic acids of the formula

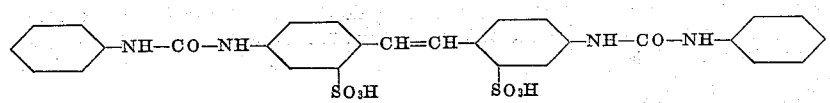

or

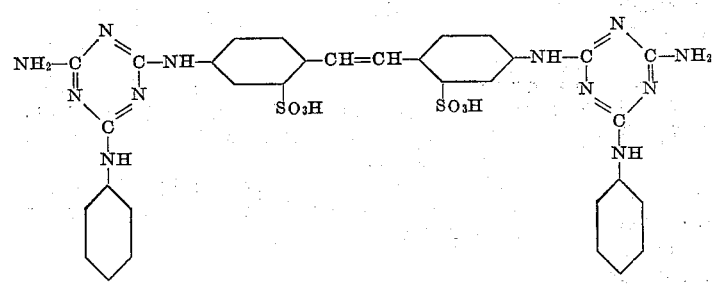

There may, however, also be employed the unsulfonated compounds having the aforementioned atom groupings, and those with the atom grouping

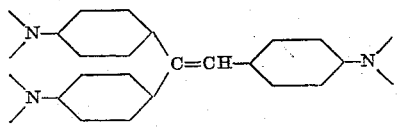

An example of the compound of the diphenyl series comprised within the present invention is the following:

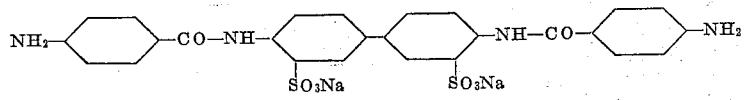

(F) Blue to violet fluorescent compounds of the 4,5-diphenyl-imidazolone-(2)-series, such as the compound of the formula

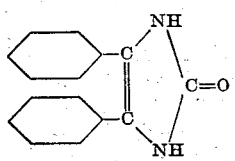

(G) Blue to violet fluorescent furan derivatives, such as 2,3,4,5-tetraphenyl furan or the compound of the formula

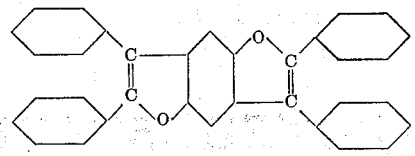

(obtainable from benzoin and hydroquinone).

(H) Blue to violet fluorescent compounds of the carbazol series.

(I) Esters, i. e. lower alkyl esters, such as methyl, ethyl, propyl esters or araliphatic esters, such as benzyl esters of dihydrocollidine dicarboxylic acid of the formula

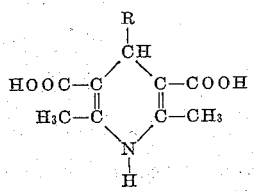

wherein R stands for an alkyl-, aryl-, aralkyl-, or a heterocyclic radical.

(J) Blue to violet fluorescent amides with basic amino groups, made from arylamines and aromatic carboxylic acids, as well as derivatives of these amides whose amino group is substituted by alkyl or aralkyl radicals. An example of this class of compounds is the compound of the formula

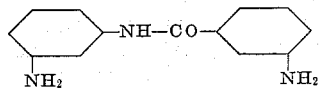

In practicing the present process a quantity of the fluorescent compounds mentioned, which is so small as to be non-toxic to man, say, 0.001 to 0.5 per cent by weight, may be mixed with the foodstuffs containing carbohydrates, by grinding the dry ingredients to be mixed. Alternatively, the aforementioned fluorescent substances may be mixed with such foodstuffs in the course of their production. They may, for instance, be admixed to the flour to be brightened while the latter is being ground. The fluorescent substances to be used in accordance with this invention can also be added in the form of solutions with subsequent elimination of the solvent. In the case of carbohydrates obtained from aqueous solutions such as is the case with sugar, those of the aforementioned fluorescent compounds which are water-soluble may be added to such solutions.

The fluorescent compounds may be added to the aqueous preparations commonly occurring as intermediate stages in the preparation of foodstuffs. They may be added e. g. to the dough to be made into baker's ware or other foodstuffs. Baker's ware made from flour pretreated according to this invention or from dough to which the aforementioned fluorescent substances have been added present a much brighter appearance than baker's ware made without such substances.

The following examples illustrate the invention without, however, being limitative thereof. The parts are by weight.

Example 1

50 parts of half-ground wheat flour are mixed with 0.025 part of 4-methyl-7-ethylamino-coumarin and ground. In this manner the white appearance of the flour is considerably enhanced. By using, in lieu of 4-methyl-7-ethylamino-coumarin, 4-methyl-6-methyl-7-ethyl-amino-coumarin, or the coumarin of the formula

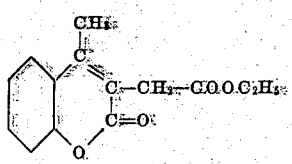

or the condensation product of 4-methyl-7-ethylamino-coumarin with formaldehyde sodium bisulfite, obtained according to Example 2 of U. S. patent application Serial No. 752,277, filed June 6, 1947, flour with similar properties is obtained. Wheat flour can be replaced by maize or rice flour.

Example 2

100 parts of white wheat flour are mixed with 0.03 part of 4-methyl-7-ethylamino-coumarin, a dough is made therefrom which in turn is used in the usual way to make baker's ware, e. g. bread.

The flour, the dough, and the baker's ware, all have a whiter appearance with this addition than without.

Instead of 4-methyl-7-ethylamino-coumarin, 0.01 part of 4-methyl-7-dimethylamino-coumarin or 4-methyl-7-ethyl-benzylamino-coumarin may be used to obtain products whose whiteness is also considerably enhanced.

Example 3

1000 parts of white wheat flour and 1 part of sodium-β-umbelliferone acetate are mixed together and ground.

In this manner a considerable brightening of the flour is effected.

In lieu of sodium-β-methyl-umbelliferone acetate there may be used other coumarins with a 7-positioned hydroxy group, such as 4-methyl-7-hydroxy-coumarin or 4-methyl-5,7-dihydroxy-coumarin, or a glucoside thereof, such as esculin. Alternatively, another of the brightening agents mentioned in the introductory part of the specification may be used, for example, 2-[4-aminophenyl]-6-methyl-benzthiazol.

Example 4

Glucose is mixed and ground with 0.05 per cent. of its weight of 4-methyl-7-ethylamino-coumarin, and in this way its appearance is considerably brightened.

Example 5

At any stage of the preparation from white wheat flour of a dough for baker's ware, there is added 0.02 per cent. by weight of the sodium salt of the sulfonated 3-benzyl-4-methyl-7-ethylamino-coumarin, dissolved in water. This salt is obtainable according to U. S. patent application Serial No. 752,277, filed June 6, 1947.

The resultant dough has a brighter appearance than a similar dough made without the addition in question.

A similar brightening effect results from the use of 4-methyl-7-dimethylamino-coumarin, dissolved in ethyl alcohol, in lieu of the sodium salt of the sulfonated 3-benzyl-4-methyl-7-ethylamino coumarin.

Example 6

100 parts of refined cane or beet sugar are mixed with 0.001 part of 4-methyl-7-dimethylamino-coumarin and ground. The resultant sugar has a whiter appearance than sugar ground without this addition. In lieu of the aforementioned coumarin, other coumarins may be used which carry as 7-positioned substituent an amino, alkylamino, or hydroxyl group.

The brightening of the sugar may alternatively be effected by adding the brightening agent mentioned to a refined sugar solution, instead of to the finished sugar. On evaporation of the solution there is also obtained a sugar presenting a brighter appearance than sugar not so treated.

Example 7

1000 parts of white wheat flour and 1 part of 4,5-diphenyl-imidazolone-(2) of the formula

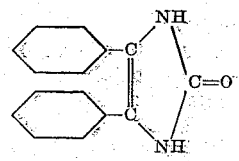

are mixed together and ground. In this manner a considerable brightening of the flour is effected. Instead of the compound of the above formula, substitution products thereof may be used, e. g. its N-alkylated or N-arylated derivatives, such as its N-methyl-, N-ethyl-, or N-phenyl derivative.

Example 8

100 parts of white wheat flour are thoroughly mixed with 0.2 part of the compound of the formula

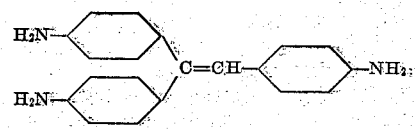

which may be prepared according to the data given in Chemisches Zentralblatt, 1930, I, page 1292. The flour has a whiter appearance with this addition than without.

Instead of the compound of the above formula the same quantity of the compound of the formula

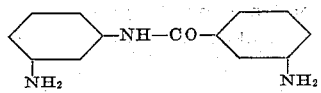

or of the formula

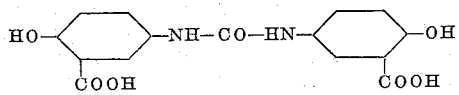

may be used to obtain flour whose white appearance is also considerably enhanced.

Example 9

At any stage of the preparation from white wheat flour of a dough for baker's ware, there is added 0.2 per cent. by weight of the diethyl ester of dihydrocollidine dicarboxylic acid of the formula

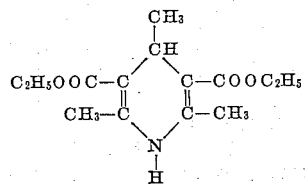

The resultant dough has a brighter appearance than a similar dough made without the addition in question.

A similar brightening effect results from the use of the furan derivative of the formula

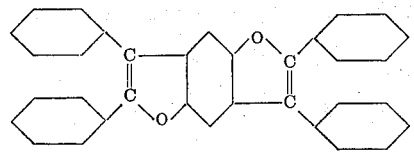

What is claimed is:

1. A foodstuff composition of enhanced whiteness which consists essentially of a carbohydrate selected from the group consisting of water-soluble saccharides and flours and 0.001 to 0.5 per cent. by weight of an odorless substance which is free from groups imparting dyestuff characteristics to the compound and when dissolved shows a blue to violet fluorescence in ultraviolet light, which is non-toxic to man when applied in the concentrations indicated above, and which is selected from the group consisting of compounds of the coumarin series substituted in the 7-position by a basic amino group, compounds of the coumarin series substituted in the 7-position by a hydroxy group, glucosides of compounds of the coumarin series substituted in the 7-position by a hydroxy group, esters of dihydrocollidine dicarboxylic acid, and alkali metal salts of dibenzofurane-3-hydroxy-4-carboxylic acid, said foodstuff composition appearing to be whiter in color than the carbohydrate per se.

2. A foodstuff composition of enhanced whiteness which consists essentially of a carbohydrate selected from the group consisting of water-soluble saccharides and flours and 0.001 to 0.5 per cent. by weight of an odorless compound of the coumarin series substituted in the 7-position by a basic amino group, which compound is free from groups imparting dyestuff characteristics to the compound and when dissolved shows a blue to violet fluorescence in ultraviolet light and which is non-toxic to man when applied in the concentrations indicated above, said foodstuff composition appearing to be whiter in color than the carbohydrate per se.

3. A foodstuff composition of enhanced whiteness which consists essentially of a carbohydrate selected from the group consisting of water-soluble saccharides and flours and 0.001 to 0.5 per cent. by weight of an odorless compound of the coumarin series substituted in the 4-position by a methyl group and in the 7-position by a basic amino group, which compound is free from groups imparting dyestuff characteristics to the compound and when dissolved shows a blue to violet fluorescence in ultra-violet light and which is non-toxic to man when applied in the concentrations indicated above, said foodstuff composition appearing to be whiter in color than the carbohydrate per se.

4. A foodstuff composition of enhanced whiteness which consists essentially of a carbohydrate selected from the group consisting of water-soluble saccharides and flours and 0.001 to 0.5 per cent. by weight of an odorless compound of the coumarin series substituted in the 4-position by a methyl group and in the 7-position by a monoalkylated amino group, which compound is free from groups imparting dyestuff characteristics to the compound and when dissolved shows a blue to violet fluorescence in ultraviolet light and which is non-toxic to man when applied in the concentrations indicated above, said foodstuff composition appearing to be whiter in color than the carbohydrate per se.

5. A foodstuff composition of enhanced whiteness which consists essentially of a carbohydrate selected from the group consisting of water-soluble saccharides and flours and 0.001 to 0.5 per cent. by weight of 4-methyl-7-ethylaminocoumarin, said foodstuff composition appearing to be whiter in color than the carbohydrate per se.

6. A foodstuff composition of enhanced whiteness which consists essentially of a carbohydrate selected from the group consisting of water-soluble saccharides and flours and 0.001 to 0.5 per cent. by weight of 4-methyl-7-dimethylaminocoumarin, said foodstuff composition appearing to be whiter in color than the carbohydrate per se.

7. A foodstuff composition of enhanced whiteness which consists essentially of a carbohydrate selected from the group consisting of water-soluble saccharides and flours and 0.001 to 0.5 per cent. by weight of 4-methyl-7-hydroxy-coumarin, said foodstuff composition appearing to be whiter in color than the carbohydrate per se.

8. A foodstuff composition of enhanced whiteness which consists essentially of a carbohydrate selected from the group consisting of water-soluble saccharides and flours and 0.001 to 0.5 per cent. by weight of diethyl ester of dihydrocollidine dicarboxylic acid of the formula

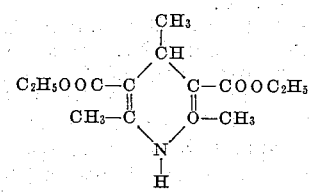

said foodstuff composition appearing to be whiter in color than the carbohydrate per se.

9. A foodstuff composition of enhanced whiteness which consists essentially of white wheat flour and 0.001-0.5 per cent. by weight of 4-methyl-7-ethyl amino-coumarin, said foodstuff composition appearing to be whiter in color than the wheat flour per se.

10. A foodstuff composition of enhanced whiteness which consists essentially of white wheat flour and 0.001-0.5 percent. by weight of 4-methyl-7 dimethylamino-coumarin, said foodstuff composition appearing to be whiter in color than the wheat flour per se.

11. A foodstuff composition of enhanced whiteness which consists essentially of beet sugar and 0.001-0.5 per cent. by weight of 4-methyl-7-dimethylamino-coumarin, said foodstuff composition appearing to be whiter in color than the beet sugar per se.

12. A process for enhancing the whiteness of a foodstuff which consists essentially of a carbohydrate selected from the group consisting of water-soluble saccharides and flours, which comprises intimately mixing the foodstuff with 0.001 to 0.5 per cent. by weight of an odorless substance which is free from groups imparting dyestuff characteristics to the compound and when dissolved shows a blue to violet fluorescence in ultraviolet light, which is non-toxic to man when applied in the concentrations indicated above, and which is selected from the group consisting of compounds of the coumarin series substituted in the 7-position by a basic amino group, compounds of the coumarin series substituted in the 7-position by a hydroxy group, glucosides of compounds of the coumarin series substituted in the 7-position by a hydroxy group, esters of dihydrocollidine dicarboxylic acid, and alkali metal salts of dibenzo-furane-3 - hydroxy - 4 - carboxylic acid, whereby the resultant composition appears to be whiter in color than the carbohydrate per se.

13. A process for enhancing the whiteness of a foodstuff which consists essentially of a carbohydrate selected from the group consisting of water-soluble saccharides and flours, which comprises intimately mixing the foodstuff with 0.001 to 0.5 per cent. by weight of an odorless compound of the coumarin series substituted in the 7-position by a basic amino group, which compound is free from groups imparting dyestuff characteristics to the compound and when dissolved shows a blue to violet fluorescence in ultraviolet light and which is non-toxic to man when applied in the concentrations indicated above, whereby the resultant composition appears to be whiter in color than the carbohydrate per se.

14. A process for enhancing the whiteness of a foodstuff which consists essentially of a carbohydrate selected from the group consisting of water-soluble saccharides and flours, which comprises intimately mixing the foodstuff with 0.001 to 0.5 per cent. by weight of an odorless compound of the coumarin series substituted in the 4-position by a methyl group and in the 7-position by a basic amino group, which compound is free from groups imparting dyestuffs characteristics to the compound and when dissolved shows a blue to violet fluorescence in ultraviolet light and which is non-toxic to man when applied in the concentrations indicated above, whereby the resultant composition appears to be whiter in color than the carbohydrate per se.

15. A process for enhancing the whiteness of a foodstuff which consists essentially of a carbohydrate selected from the group consisting of water-soluble saccharides and flours, which comprises intimately mixing the foodstuff with 0.001 to 0.5 per cent. by weight of an odorless compound of the coumarin series substituted in the 4-position by a methyl group and in the 7-position by a mono-alkylated amino group, which compound is free from groups imparting dyestuff charatceristics to the compound and when dissolved shows a blue to violet fluorescence in ultraviolet light and which is non-toxic to man when applied in the concentrations indicated above, whereby the resultant composition appears to be whiter in color than the carbohydrate per se.

16. A process for enhancing the whiteness of a foodstuff which consists essentially of a carbohydrate selected from the group consisting of water-soluble saccharides and flours, which comprises intimately mixing the foodstuff with 0.001 to 0.5 per cent. by weight of 4-methyl-7-ethylamino-coumarin, whereby the resultant composition appears to be whiter in color than the carbohydrate per se.

17. A process for enhancing the whiteness of a foodstuff which consists essentially of a carbohydrate selected from the group consisting of water-soluble saccharides and flours, which comprises intimately mixing the foodstuff with 0.001 to 0.5 per cent. by weight of 4-methyl-7-dimethylamino-coumarin, whereby the resultant composition appears to be whiter in color than the carbohydrate per se.

18. A process for enhancing the whiteness of a foodstuff which consists essentially of a carbohydrate selected from the group consisting of water-soluble saccharides and flours, which comprises intimately mixing the foodstuff with 0.001 to 0.5 per cent. by weight of 4-methyl-7-hydroxy-coumarin, whereby the resultant composition appears to be whiter in color than the carbohydrate per se.

19. A process for enhancing the whiteness of a foodstuff which consists essentially of a carbohydrate selected from the group consisting of water-soluble saccharides and flours, which comprises intimately mixing the foodstuff with 0.001 to 0.5 per cent. by weight of diethyl ester of dihydrocollidine dicarboxylic acid of the formula

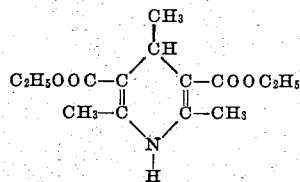

whereby the resultant composition appears to be whiter in color than the carbohydrate per se.

20. A process for enhancing the whiteness of white wheat flour which comprises intimately admixing the flour with 0.001-0.5 per cent. by weight of 4 - methyl - 7 - ethylamino - coumarin, whereby the resultant composition appears to be whiter in color than the flour per se.

21. A process for enhancing the whiteness of white wheat flour which comprises intimately admixing the flour with 0.001-0.5 per cent. by weight of 4-methyl-7-dimethylamino-coumarin, whereby the resultant composition appears to be whiter in color than the flour per se.

22. A process for enhancing the whiteness of beet sugar which comprises intimately admixing the beet sugar with 0.001-0.5 per cent. by weight of 4-methyl-7-dimethylamino-coumarin, whereby the resultant composition appears to be whiter in color than the beet sugar per se.

HANS-HEINI ZWEIFEL.
FRANZ ACKERMANN.

References Cited in the file of this patent

UNITED STATES PATENTS

| Number | Name | Date |
|---|---|---|
| 576,860 | Lanaux | Feb. 9, 1897 |
| 2,146,958 | Kotera | Feb. 14, 1939 |

OTHER REFERENCES

Rehwald: Starch Making, pub. by Scott, Greenwood and Son, London, 1926, pp. 200–201.

Fairrie, Sugar, pub. by Fairrie and Co. Ltd., Liverpool, 1925, page 101.

Chemical Abstracts 42: 7044 (a), Joseph Lyman Switzer et al., Canada 447,751, April 13, 1948.